United States Patent [19]

Lobenstein et al.

[11] 4,361,891

[45] Nov. 30, 1982

[54] SPREAD SPECTRUM SIGNAL ESTIMATOR

[75] Inventors: Helmut Lobenstein, Utica; Marshall K. Quick, Whitesboro, both of N.Y.

[73] Assignee: General Electric Company, Utica, N.Y.

[21] Appl. No.: 218,899

[22] Filed: Dec. 22, 1980

[51] Int. Cl.³ ........................................... H04B 15/00
[52] U.S. Cl. ..................................... 375/1; 375/115; 370/107
[58] Field of Search ................ 375/1, 34, 94, 58, 115; 370/93, 107; 343/100 SA, 100 LE, 100 CL, 5 PN; 455/276, 278

[56] References Cited

U.S. PATENT DOCUMENTS

| | | | |
|---|---|---|---|
| 4,079,380 | 3/1978 | Esry et al. | 375/1 |
| 4,079,381 | 3/1978 | Piesinger | 343/100 CL |
| 4,152,702 | 5/1979 | Piesinger | 343/100 CL |
| 4,156,877 | 5/1979 | Piesinger | 375/1 |
| 4,217,586 | 8/1980 | McGuffin | 375/1 |
| 4,271,524 | 6/1982 | Goodman et al. | 375/1 |
| 4,309,769 | 1/1982 | Taylor, Jr. | 375/1 |

*Primary Examiner*—Benedict V. Safourek
*Assistant Examiner*—Stephen Chin
*Attorney, Agent, or Firm*—Stephen A. Young

[57] ABSTRACT

A PN sequence signal estimator is described which synergistically co-operates with an adaptive array processor and a spread spectrum communication system modem such that the adaptive array will null interfering signals, but not desired signals. This is accomplished with the signal estimator generating an estimate of the desired coded signal through the use of the local code and the detected correlation in the modem, and feeding the estimate back to the array in such a manner that it subtracts from the array error voltage, thereby inhibiting null formation.

6 Claims, 3 Drawing Figures

SPREAD SPECTRUM SIGNAL ESTIMATOR

BACKGROUND OF THE INVENTION

1. Field of the Invention

The present invention relates to a spread spectrum signal estimator and more specifically to one which interfaces with a spread spectrum modem and adaptive array processor in such a way that the adaptive array can null interfering signals, but not the desired signals.

2. Description of the Prior Art

The basic attempt at signal null inhibition for adaptive arrays appeared in the technical article entitled "Adaptive Antenna Systems", B. Widrow, et al., *Proceedings of the IEEE*, Vol. 55, No. 12, Dec. 1967, pp. 2143-2159. Widrow's system required a knowledge of the direction of signal incidence and did not address the pseudo noise (PN) type of received signal.

A PN type of estimator has been disclosed by R. T. Compton et al., in a technical article entitled "Adaptive Arrays For Communication Array Systems: An Overview of Research at the Ohio State University", appearing in the *IEEE Transactions on Antennas and Propagation*, Vol. AP-24, No. 5, Sept. 1976, and in "Adaptive Antennas for Speed Spectrum Communication Systems", D. C. Upp et al., Ohio State University, Interim Technical Report 3098-3, Oct. 1972, Contract N00014-67-A-0232-0009, AD 754444. These publications disclose an estimator that is quite complex and has the ability to handle one signal only, i.e., no conferencing capability. It uses a delay lock tracking loop for synchronization and as stated in D. C. Upp's report "although this type of synchronization is acceptable for laboratory purposes, it would not be suitable for acquisition in a real communication system".

SUMMARY OF THE INVENTION

It is accordingly an object of the invention to provide a novel and improved PN sequence signal estimator that can effectively operate with an adaptive array processor and a PN communication modem to null interfering signals, but not desired signals.

A further object of the invention is to provide a novel and improved signal estimator that can realize the first aforementioned objective while processing multiple simultaneous signals. This will give the communication system a conferencing capability.

Another object of the invention is to provide a signal estimator that can generate a signal estimate of the coded desired signal through the use of a local code and detected correlation in the modem, and feed the estimate back to the array in such a manner that it subtracts from the array error voltage, thereby inhibiting null formation.

Another object of the invention is to provide a signal estimator that requires no apriori knowledge of direction of signal incidence or power spectrum, and no extremely precise timing or signal amplitude replication.

Yet another object of the invention is to provide a signal estimator that has the advantages of low production cost, small size, weight, power, and long life.

Still another object of the invention is to provide a signal estimator that can meet the stringent environmental and reliability requirements associated with avionic systems.

These and other objectives of the invention are accomplished in accordance with one aspect thereof by a signal estimator which generates a signal estimate of the coded desired signal through the use of a local code and detected correlation in the modem, and by feeding the estimate back to the array processor in such a manner that it subtracts from the array error voltage, thereby inhibiting null formation.

BRIEF DESCRIPTION OF THE DRAWINGS

Various other objects, features and attendant advantages of the present invention will be more fully appreciated from the following detailed description when considered in connection with the accompanying drawings.

DESCRIPTION OF THE PREFERRED EMBODIMENT

Figure 1:
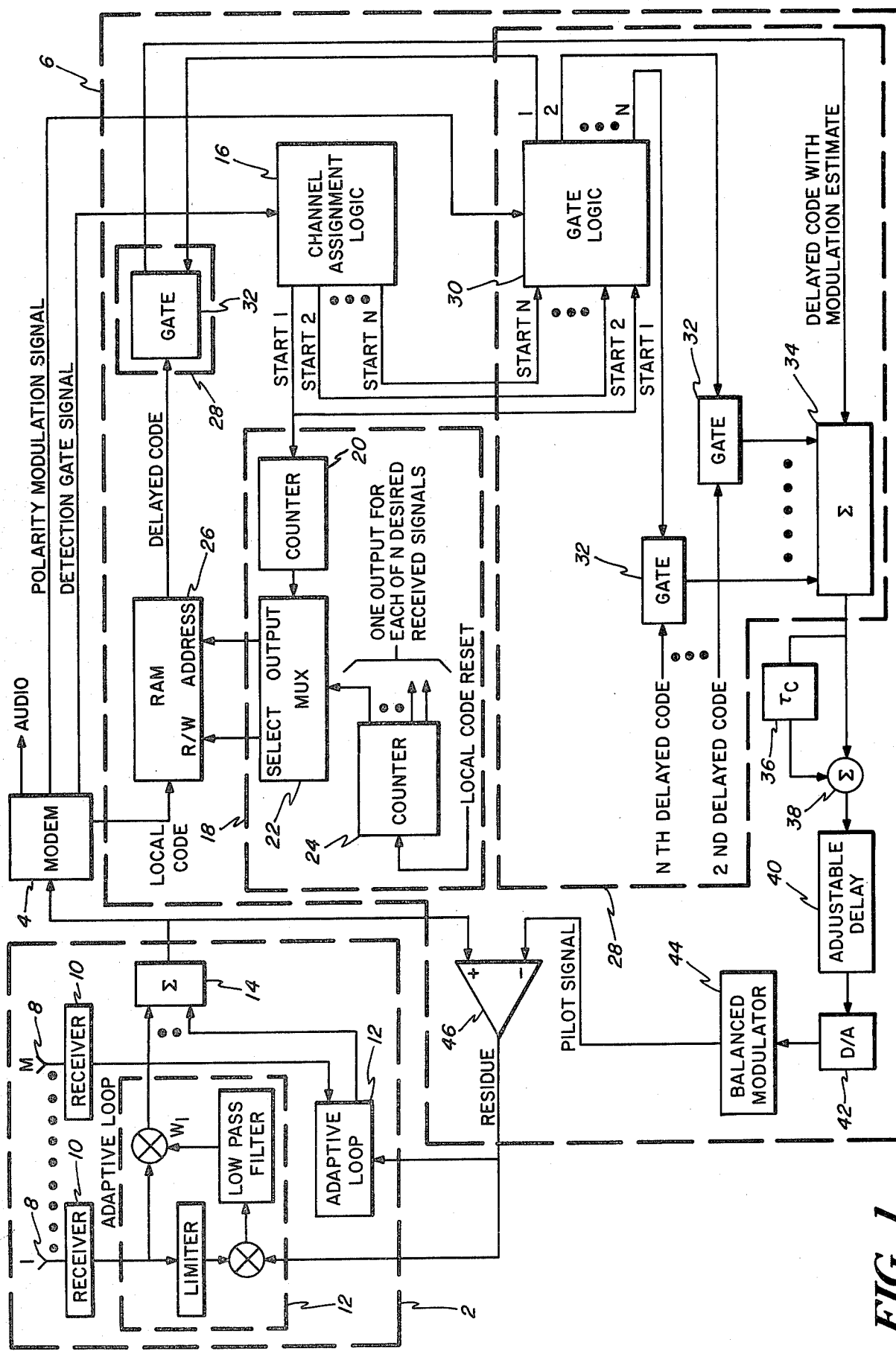
FIG. 1 is a conceptual block diagram of the instant invention.

With reference to FIG. 1, there is illustrated a conceptual block diagram of an adaptive array processor 2, a communication modem 4, and a signal estimator 6. Signal estimator 6 can accommodate a plurality of pseudo-noise (PN) communication signals without requiring extremely precise timing, without depending upon replication of signal amplitudes, and can function with previous data modulation extraction (a polarity modulation signal) to form the estimate.

The configuration in FIG. 1 shows that up to N separate PN signals can be accommodated. This means that the pilot signal, which is the output of signal estimator 6 can be the sum of one through N separate PN code sequences matched to specific codes detected by communication modem 4.

Adaptive array processor 2 consists of antennas 8, receivers 10, and adaptive loops 12 and a summer 14 which are conventional elements of prior art adaptive array processors. Modem 4 is a communication system modem similar to that described in patent application Ser. No. 629,248, now under a secrecy order, having three output signals, a detection gate signal, a polarity modulation signal and a local PN code signal which are required for the operation of the signal estimator. The detection gate signal appears after a received PN code signal has been correlated with a local PN code signal within modem 4. Such a detection gate signal is shown in FIG. 2E. The polarity modulation signal is either a +1 or a −1 depending upon the modem's determination of how the received PN sequence, e.g., code I-1, in FIG. 2C, had been modulated. The signal estimator utilizes the polarity modulation signal as an estimate of the modulation on the next PN code to be received, code I. The polarity of audio signals is highly correlated from sample to sample (i.e., due to the much faster sampling rate than the audio rate), thereby resulting in a relatively low probability of error.

Signal estimator 6 is composed of channel assignment logic 16 which contains the channel assignment means necessary to accept a detection gate signal from modem 4 and to allocate said signal to activate one of N read/write means 18. Each read/write means 18 includes a counter 20 and a multiplexer 22. All read/write means 18 share a local counter 24 which is a K bit counter, where the number of chips within each PN code is equal to $2^K$.

Local counter 24 begins its counting sequence with a number 0 once it has received a local code reset pulse (see FIG. 2B) from modem 4 signifying that a new local code is present within modem 4 and ready to begin a correlating process with the array output signal within modem 4. The K bit counting sequence is transmitted from counter 24 to multiplexer 22 which utilizes the counting sequence as an address reference number for each sample of the local code that is read into random access memory 26 which acts as a local code storage means.

Figure 2:
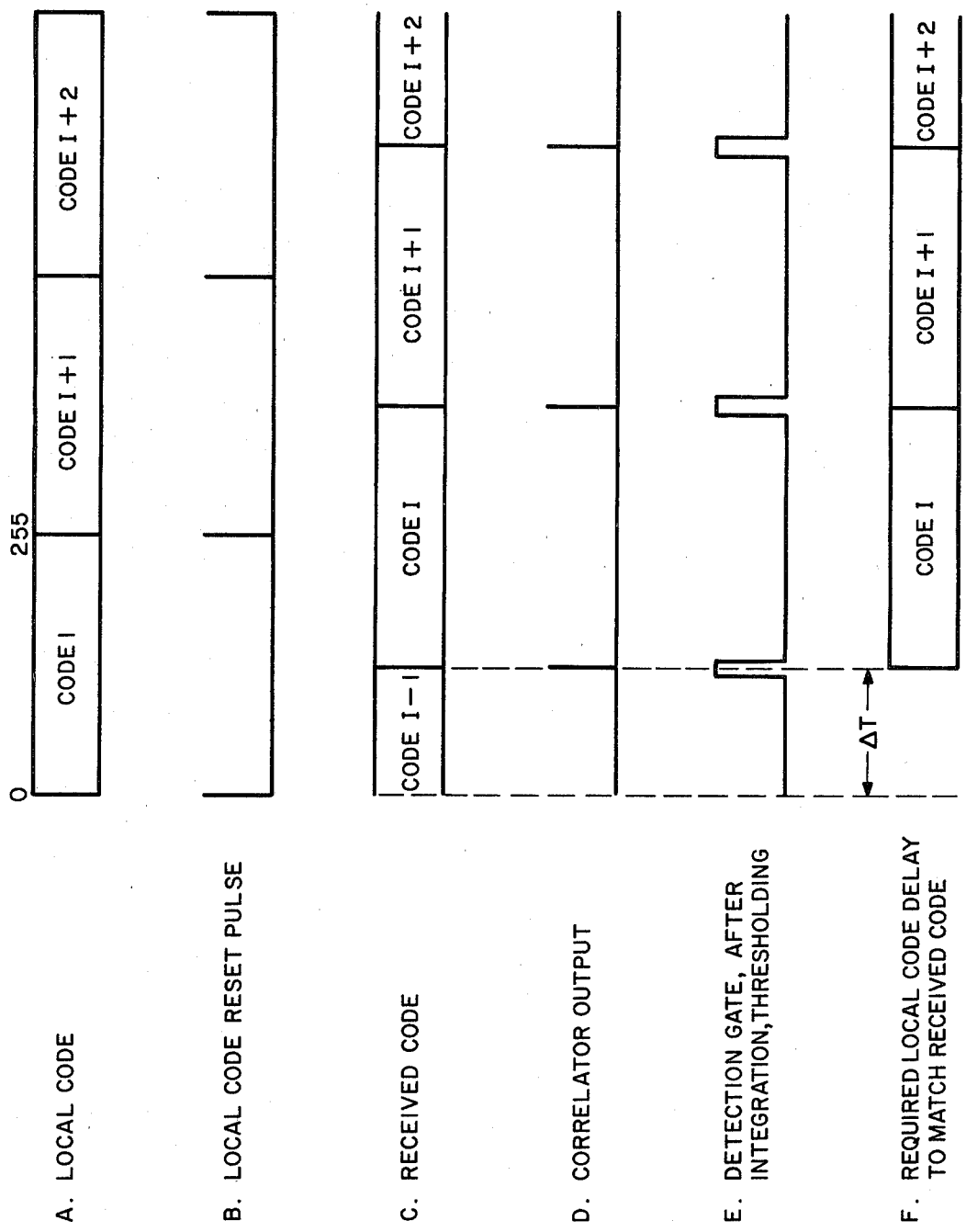
FIG. 2 is a timing diagram of local PN codes and received PN codes.

As soon as code I-1 is present as the received code (see FIG. 2C) within the aray output signal and has correlated with local code I-1, a maximum correlator output is attained within modem 4, as shown in the first high valued signal in FIG. 2D. At the time of the maximum correlator output, modem 4 will transmit a detection gate signal to channel assignment logic 16. Assuming that this is the ith detection gate signal received by channel assignment logic 16, it will send a start i signal to the ith read/write means 18. Counter 20 once activated by the start i signal is a K bit counter that will begin its counting sequence from number 0. Multiplexer 22 utilizes the counting sequence received from counter 20 as an address reference to locate the first sample of code I which is stored within random access memory 26. In this way counter 20 is used to read code I out of RAM 26 after code I-1 has been detected by modem 4. Notice that the ΔT shown in FIGS. 2 and 3 represent the required delay between local code I-1 and the start of the received code I.

Gating means 28 containing gate logic 30, gates 32 and summing means 34 so that each respective estimated code can be properly modulated. Gate logic 30 associates the start signal from channel assignment logic 16 with its associated polarity modulation signal so that when the appropriate PN code is extracted from RAM 26, in our example code I, it can be appropriately weighted by the appropriate polarity modulation signal at gate 32. Since, in this example the polarity modulation signal is a +1 or a −1, the gate 32 merely passes or inverts the delayed code signal corresponding to code I.

Since a plurality of communication signals may comprise the array output signal, that is one signal from N different transmitters, there may be N different detection gate signals generated by modem 4.

Figure 3:
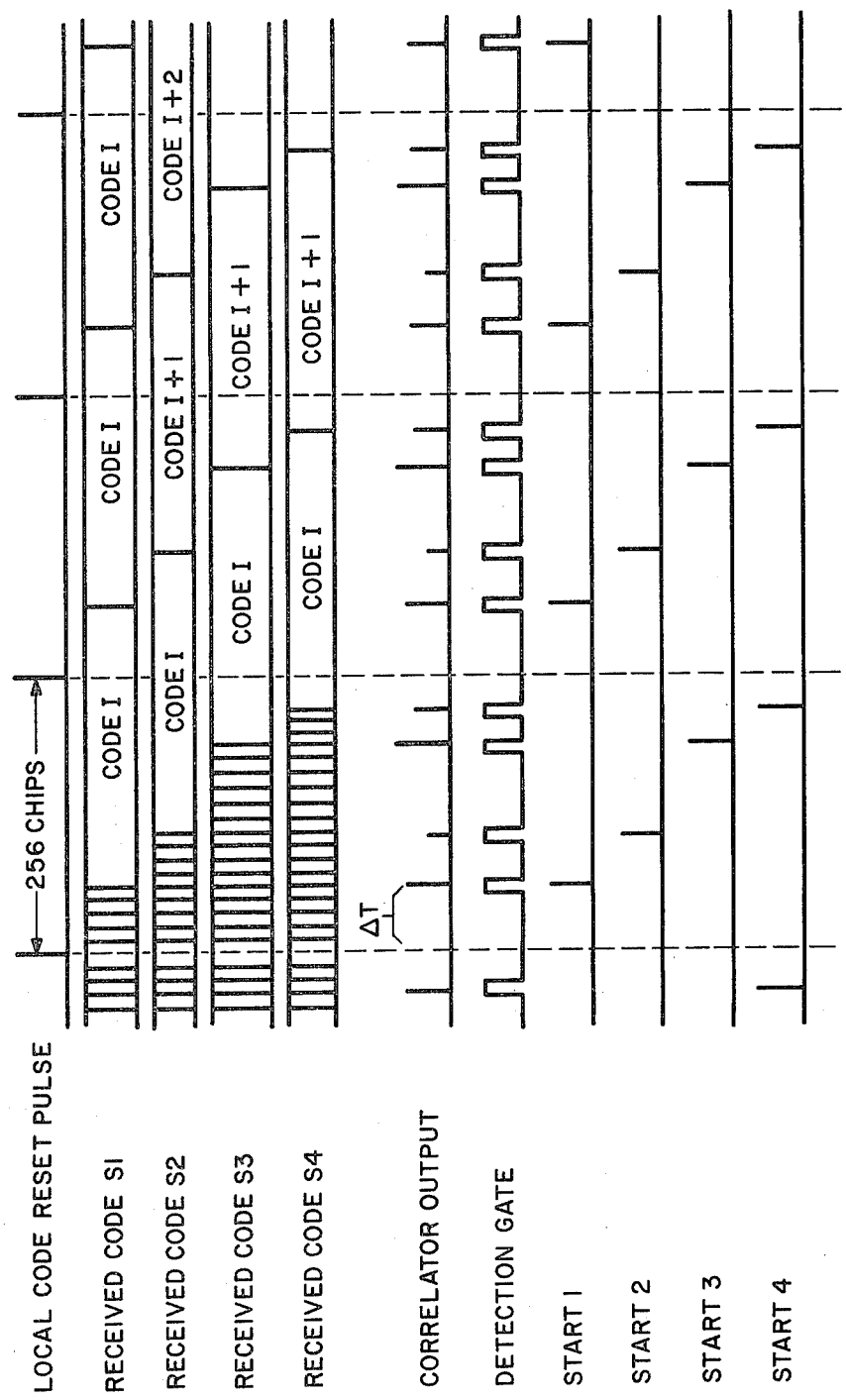
FIG. 3 illustrates the channel assignment timing for various received PN codes enabling the system to have a conference capability.

FIG. 3 illustrates some basic timing signals when 4 different transmitted signals S1 through S4, are received and comprise the array output signal. The Figure also assumes that the number of chips within each PN code is equal to 256, so that each counter 20 and 24 have 8 bit sequences. In such a case the start 1 signal shown in FIG. 3 is associated with its respective polarity modulation signal, and the start 2 signal is associated with its respective polarity modulation signal, etc., by means of gate logic 30. Gate logic 30 must then have all its output signals which are really the polarity modulation signals ready to weight their respective PN codes by means of gates 32 at the start of each code I as they are outputted from their respective local storage means.

All such weighted PN codes at the outputs of all gates 32 are then added together by summing means 34 to produce a composite signal containing the PN codes that are expected to be received from all N signal sources.

The pilot signal thus produced is subtracted from the array output signal by subtracting means 46 to yield a residue signal. Since the residue signal now does not contain any of the desired PN coded signals, adaptive processor 2 will function in such a manner as to null only interferring signals and not the desired signals.

To provide a good signal estimate, the pilot signal should be time coincident with the array output signal at subtracting means 46. If this objective is met, the array will reach an equilibrium condition where the array output is matched both in phase and amplitude to the pilot signal, and the desired received signal will therefore be retained instead of being nulled by the adaptive processor.

If a code offset in excess of a chip period, Tc, occurs between the pilot and received signal, the cross-correlation is essentially zero and the pilot signal will be ineffective.

The system performance follows a standard triangular cross-correlation response. For instance, if the pilot delay is adjusted such that a chip, of width T, spans the peak of the correlation function, whose base extends from −Tc to +Tc, a 6 Db variation will occur. If the delay is Tc, where T=TC, then as stated previously no correlation takes place.

Since the detection gate in many modems is fixed relative to the local clock that generates the local code, a time offset, T, over a range slightly greater than a chip time is possible when the correlated pulse is at the gate extremes. This effect may be compensated for by delaying the pilot code by Tc (delay element 36) and summing it with the original pilot signal (utilizing summer 38). The resulting cross-correlation function is the sum of the original cross-correlation with the received code within the array output signal, and a cross-correlation delayed by Tc. Hence there is a range Tc wide for $0 \leq T \leq Tc$ where the error correlation function is constant.

For proper operation the pilot signal code delay must fall in the range of 0 to Tc. This technique is useful in general to allow for some pilot code misalignment due to environmental causes, and allow for crude estimate bootstrapping.

The function of adjustable delay 40 is to initially adjust the pilot signal to meet the above conditions. Digital to analog converter 42 and balanced modulator 44 are used if the adaptive processor, and received code, are operating at an RF or IF frequency. D/A 42 converts the binary signal to an analog signal in order to phase modulate the IF or RF impressed on the balanced modulator 44.

In the event that the array is operating at baseboard the D/A and modulator may be omitted.

While a preferred embodiment of the invention has been shown and described, various other embodiments and modifications thereof will become apparent to persons skilled in the art, and will fall within the scope of invention as defined in the following claims.

We claim:

1. A signal estimator utilizing an array output signal applied to the input of a communication modem and produced from an adaptive array processor in response to a received pseudo noise communication signal, and a detection gate signal and a polarity modulation signal from the communication modem in order to generate a signal estimate of a desired signal, said signal estimator comprising:

(a) a channel assignment means receiving said detection gate signal and allocating said signal to one of its N output channels;

(b) a local code storage means containing a unique pseudo random noise (PN) code designated by the communication modem;

(c) a plurality of read/write means, each of said read/write means having an input terminal and an output terminal, said input terminal being connected to one of said N output channels of said channel assignment means, said read/write means being able to read a pseudo random noise (PN) code from said local code storage means;

(d) a gating means receiving said pseudo random noise (PN) code from said read/write means and weighting said code with said polarity modulation signal from the communication modem to yield a pilot signal; and (e) a subtraction means calculating a residue signal by subtracting said pilot signal from said array output signal.

2. The signal estimator as claimed in claim 1, further including a one chip delay element and a summing element, said delay element delaying said pilot signal by at least one chip time and said summing element calculating the sum of said pilot signal and said pilot signal delayed by at least one chip time, said sum being a modified pilot signal.

3. The signal estimator as claimed in claim 2, further including an adjustable delay means in order to delay said modified pilot signal before it reaches said subtractor means.

4. A signal estimator utilizing an array output signal applied to the input of a communication modem and produced from an adaptive array processor in response to a received pseudo noise communication signal, and N detection gate signals and N polarity modulation signals from the communication modem in order to generate a signal estimate of N desired signals, said signal estimator comprising:

(a) a channel assignment means receiving one of said detection gate signals and allocating said signal to one of its N output channels;

(b) N local code storage means containing a pseudo random noise (PN) code designated by the communication modem;

(c) N read/write means, each of said read/write means having an input terminal and an output terminal, said input terminal being connected to one of said N output channels of said channel assignment means, each of said read/write means being able to read a pseudo noise (PN) code from said local code storage means, each of said read/write means being able to output a PN code corresponding to that portion of a PN code that is known apriori to follow a PN code that had been correlated in the modem to cause said detection gate signal to have been generated;

(d) a gating means receiving at least one pseudo random noise (PN) code from at least one of said read/write means and weighting said code with said polarity modulation signal that corresponds to said detection gate signal from the communication modem, said gating means containing a summing means that yields a pilot signal by combining all pseudo random noise (PN) codes after they have each been separately weighted by said polarity modulation signals; and (e) a subtraction means calculating a residue signal by subtracting said pilot signal from said array output signal.

5. The signal estimator as claimed in claim 4, further including a one chip delay element and a summing element, said delay element delaying said pilot signal by at least one chip time and said summing element calculating the sum of said pilot signal and said pilot signal delayed by at least one chip time, said sum being a modified pilot signal.

6. The signal estimator as claimed in claim 5, further including an adjustable delay means in order to delay said modified pilot signal before it reaches said subtractor means.

* * * * *